United States Patent [19]
Wu

[11] Patent Number: 5,709,075
[45] Date of Patent: Jan. 20, 1998

[54] CHAIN

[76] Inventor: Chia-long Wu, No. 734, Chungshan Rd., Kuei Ren Hsiang, Tainan Hsien, Taiwan

[21] Appl. No.: 788,854

[22] Filed: Jan. 23, 1997

[51] Int. Cl.[6] ............................................. F16G 13/06
[52] U.S. Cl. ............................. 59/4; 474/206; 59/78
[58] Field of Search .......................... 59/4, 5; 474/206, 474/207, 216, 231, 209

[56] References Cited

U.S. PATENT DOCUMENTS

| | | | |
|---|---|---|---|
| 5,322,482 | 6/1994 | Wang | 474/206 |
| 5,322,483 | 6/1994 | Wang | 474/206 |
| 5,437,148 | 8/1995 | Karp | 474/209 |

FOREIGN PATENT DOCUMENTS 18169  9/1989  United Kingdom ................. 474/231

Primary Examiner—David Jones
Attorney, Agent, or Firm—Gunn, Lee & Miller, P.C.

[57] ABSTRACT

A chain consists of at least a pair of chain links, a pair of side plates mounted between the chain links, a chain roller composed of at least two rolling elements mounted between the side plates, and a rivet extending through the chain links, the side plates and the rolling elements, wherein the rivet is tightly fitted with the chain links and loosely fitted with the side plates and the rolling elements so that the side plates and the rolling elements can have a pivotable movement relative to the chain links and the rivet.

4 Claims, 3 Drawing Sheets

CHAIN

FIELD OF THE INVENTION

The present invention is related to a chain, particularly to a chain having rollers each of which is composed of a plurality of small rolling elements.

BACKGROUND OF THE INVENTION

A chain is a well known device for transmitting a rotation between two sprockets. Generally, a chain comprises a plurality of chain links, side plates, rivets, rollers and possible bushings which are assembled together in a well known manner.

To meet sprockets which have different thicknesses, a chain manufacturer must produce rollers having a variety of lengths but to manufacture and store rollers with various lengths consumes both time and money. Furthermore, when assembling the chain, a worker must carefully choose rollers having a proper length, which is laborious.

The present invention therefore is aimed to provide an improved chain to mitigate and/or obviate the aforementioned problems.

SUMMARY OF THE INVENTION

An objective of the present invention is to provide a chain, wherein each of the rollers of the chain is composed of a plurality of small rolling elements so that the length of the rollers is variable by increasing/decreasing the number of the rolling elements to meet the requirements of different sprockets which have different thicknesses, whereby the high cost of manufacturing and storing rollers having different lengths can be overcome.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
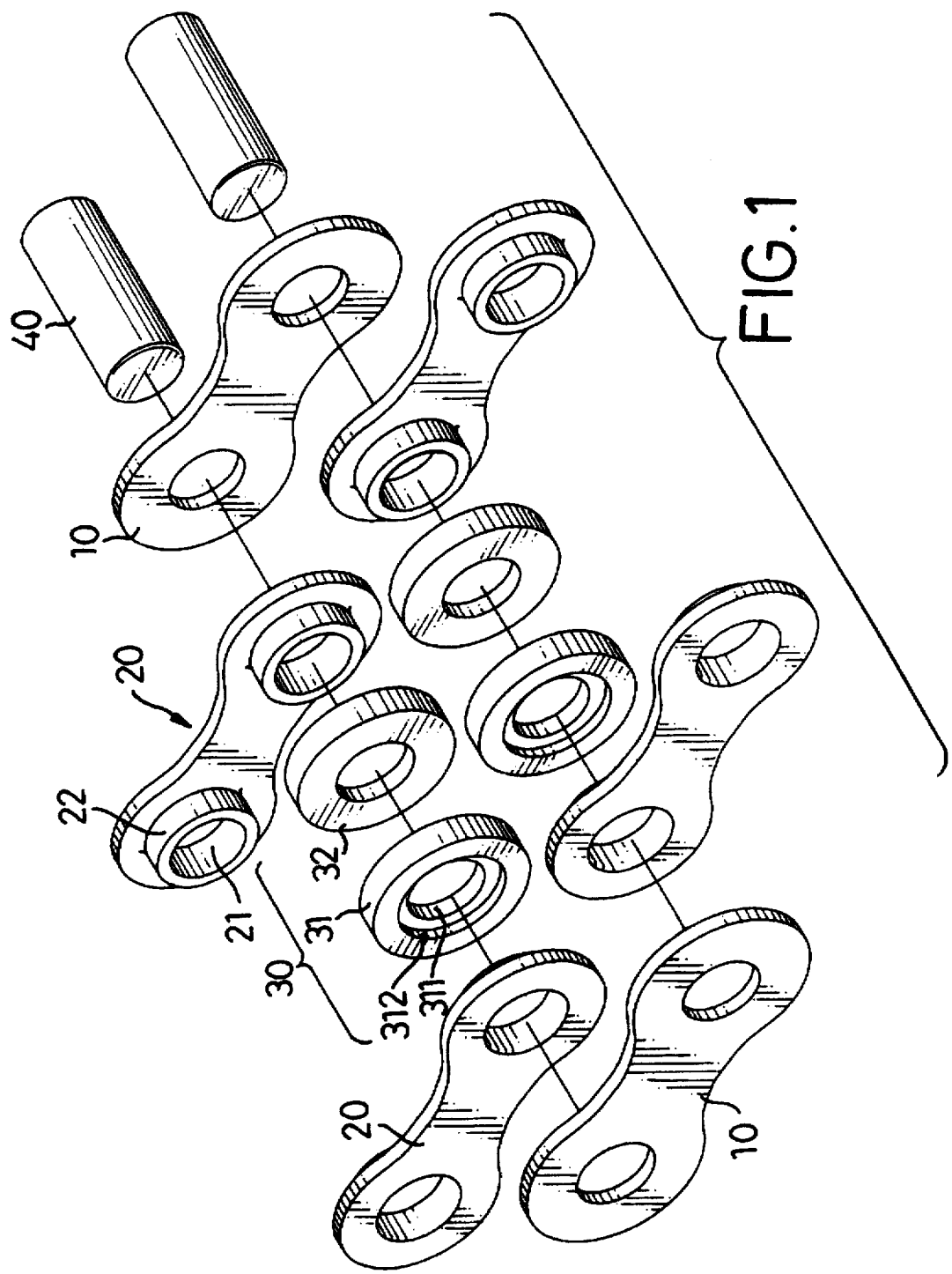
FIG. 1 is a perspective, exploded view showing a portion of a chain in accordance with a first embodiment of the present invention.
Figure 2:
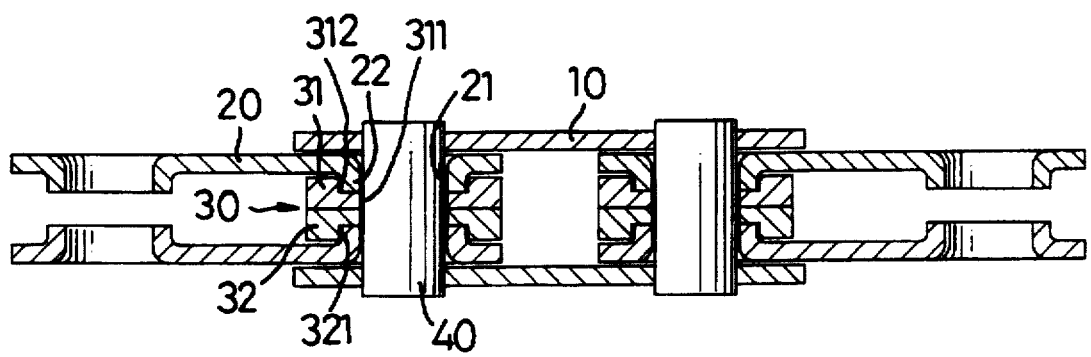
FIG. 2 is a cross-sectional view showing the portion of the chain of FIG. 1 in an assembled state.

FIGS. 1 and 2 show a portion of a chain in accordance with a first embodiment of the present invention consisting of a pair of chain links 10, two pairs of side plates 20, a pair of rollers 30 and a pair of rivets 40. Although throughout the embodiments of the present invention the chains are not equipped with bushings, it can be understood by those skilled in the art that bushings can be provided to the present invention to be located between the chain links 10 and the side plates 20.

Since the chain links 10 and the rivets 40 in the present invention have structures the same as those of prior art chains, detailed descriptions thereof are omitted here.

The two pairs of side plates 20 comprise a front pair and a rear pair. An inner face of each side plate 20 has two flanges 22 formed thereon. A front hole 21 and a rear hole are respectively defined in each of the side plates 20 via the flanges 22. The front holes 21 of the front pair of sidle plates 20 are in alignment, as are the rear pair of holes thereof. The front holes of the rear pair of side plates 20 are in alignment, as are the rear holes thereof. The chain links 10 each define a first rivet hole and a second rivet hole (not labeled). The first rivet holes align with the rear aligned holes of the front side plate 20. The second rivet holes align with the front aligned holes of the rear side plates. A roller 30 consisting of two small rolling elements 31 and 32 is sandwiched between the front pair of side plates 20 and are respectively mounted on two rearmost flanges. A second roller which also consists of two small rolling elements is sandwiched between the rear pair of side plates and is mounted on two frontmost flanges. A first rivet 40 extends through the first rivet holes of the chain links 10, the rear aligned holes and rear most flanges of the front side plates 20 and the roller 30. A second rivet extends through the second rivet holes of the chain links 10, the front aligned holes and frontmost flanges of the rear side plates and the second roller.

Since the two rolling elements 31 and 32 have the same configuration, only the configuration of the rolling element 31 will be detailedly disclosed here.

The rolling element 31 defines a central hole 311 for a respective rivet 40 to extend therethrough and a counterbore 312 in communication with the central hole 311. The counterbore 312 has a diameter larger than that of the flange 22 and is oriented facing a respective side plate 20.

Particularly referring to FIG. 2, when the constituting parts of the portion of the chain are assembled, the rivets 40 are tightly fitted with the chain links 10 and loosely fitted with the side plates 20 and the rolling elements 31 and 32 so that the side plates 20 and the rolling elements 31 and 32 can have a pivotable movement relative to the rivets 40 and the chain links 10. Furthermore, in the assembled state, the flanges 22 are respectively extended into the counterbores 312 defined respectively in the rolling elements 31 and 32.

In the present invention, each of the rollers 30 is composed of small rolling elements so that the length of the rollers 30 can be changed by increasing or decreasing the number of the rolling elements to meet the requirements of different sprockets which have different thicknesses.

Figure 3:
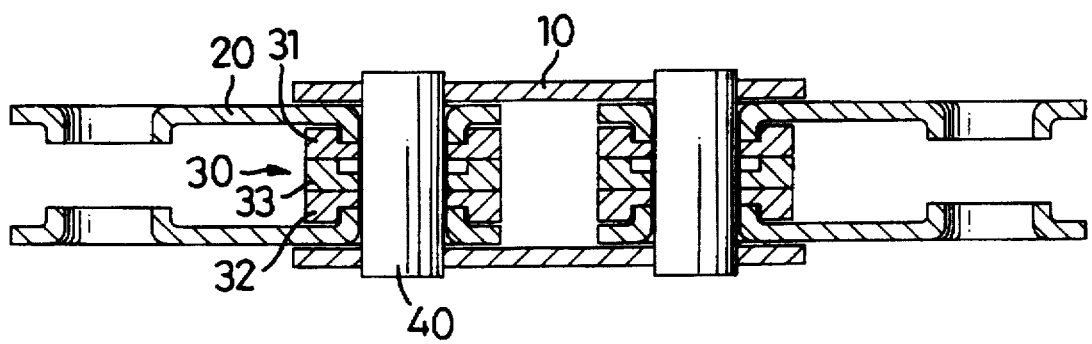
FIG. 3 is a view similar to FIG. 2 but showing a second embodiment of the present invention.

As shown in FIG. 3, which shows a second embodiment of the present invention, the length of each of the rollers 30 is increased by adding a third rolling element 33 which has a configuration the same as that of the other two rolling elements 31 and 32. Although each of the rolling elements 33, as shown in FIG. 3, has an orientation that its counterbore faces upwardly, it should be understood that such an orientation is arbitrary. Each of the rolling elements 33 can be reversed from the position as shown by FIG. 3.

By simply adding the rolling elements 33 and using rivets 40 having a suitable length (i.e., longer than that of the first embodiment), the chain as shown by FIG. 3 can be used for a sprocket which has a thickness larger than that of the sprocket that the chain as shown by FIGS. 1 and 2 is used for.

Figure 4:
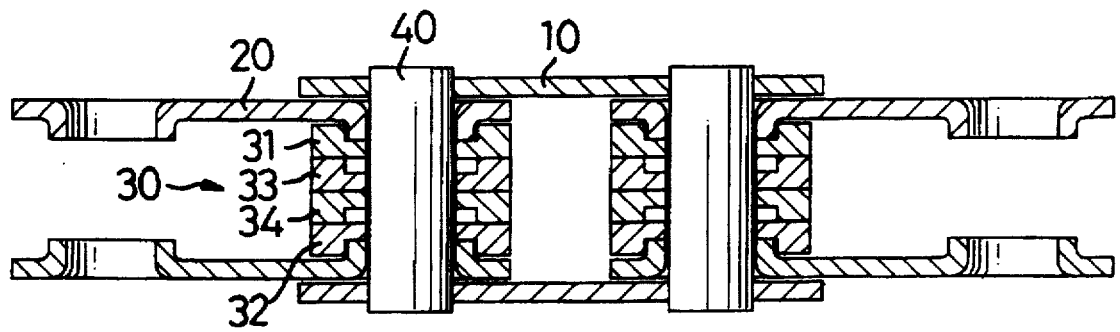
FIG. 4 is a view similar to FIG. 2 but showing a third embodiment of the present invention.

FIG. 4 shows a third embodiment of the present invention, wherein the length of each of the rollers 30 is further increased by adding a rolling element 34 to the chain.

Figure 5:
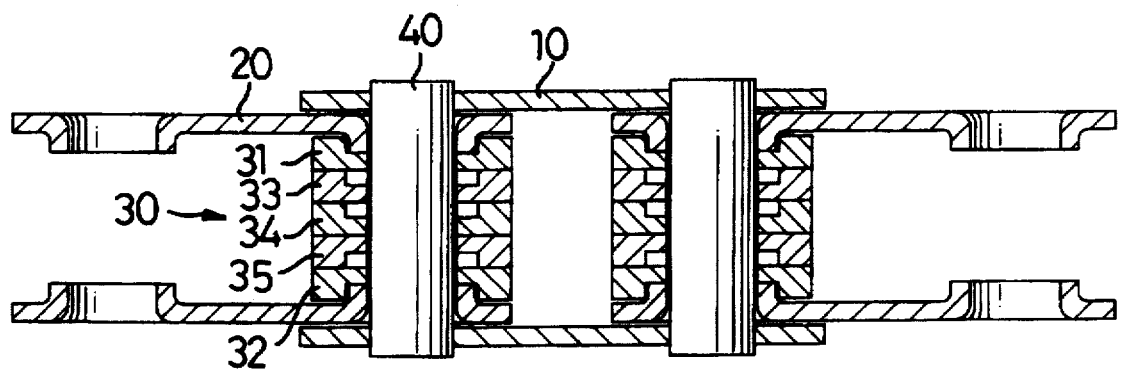
FIG. 5 is a view similar to FIG. 2 but showing a fourth embodiment of the present invention.

FIG. 5 shows a fourth embodiment of the present invention, wherein the length of each of the rollers 30 is further increased by adding a rolling element 35 to the chain. The rolling elements 31, 32, 33, 34 and 35 have the same configuration.

From the above disclosure, it is clear that the present invention can overcome the disadvantage of prior art which needs to manufacture a variety of kinds of rollers with different lengths to meet the requirements of sprockets which have different thicknesses.

Furthermore, since each of the rolling elements is formed with a counterbore, the rollers as shown by FIGS. 4 and 5 can have a weight lighter than that of prior art roller.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A chain, comprising:

a pair of chain links;

a pair of side plates mounted between said chain links, each said side plate comprising a first hole and a flange around said first hole;

a roller consisting of a pair of rolling elements mounted between said side plates, each said rolling element comprising a second hole and a counterbore in communication with said second hole, said flanges being extended respectively into said counterbores; and a rivet extending through the chain links, said first holes of said side plates, and said second holes of said rolling elements and being tightly fitted with said chain links and loosely fitted with said side plate and said rolling elements, said side plates and said rolling elements being pivotable relative to said rivet and said chain links.

2. The chain in accordance with claim 1 further comprising at least an additional rolling element between said pair of rolling elements, said additional rolling element having a configuration the same as that of said pair of rolling elements.

3. A chain, comprising:

a pair of chain links;

a pair of side plates mounted between said chain links;

a roller consisting of a pair of rolling elements mounted between said side plates, each said rolling element comprising a counterbore; and a rivet extending through said chain links, said side plates, and said rolling elements and being tightly fitted with said chain links and loosely fitted with said side plates and said rolling elements, said side plates and said rolling elements being pivotable relative to said rivet and said chain links.

4. The chain in accordance with claim 3 further comprising at least an additional rolling element between said pair of rolling elements, said additional rolling element having a configuration the same as that of said pair of rolling elements.

* * * * *